March 2, 1937. J. SISHC 2,072,186
BEET DIGGING AND TOPPING MACHINE
Filed Feb. 4, 1936 5 Sheets-Sheet 3
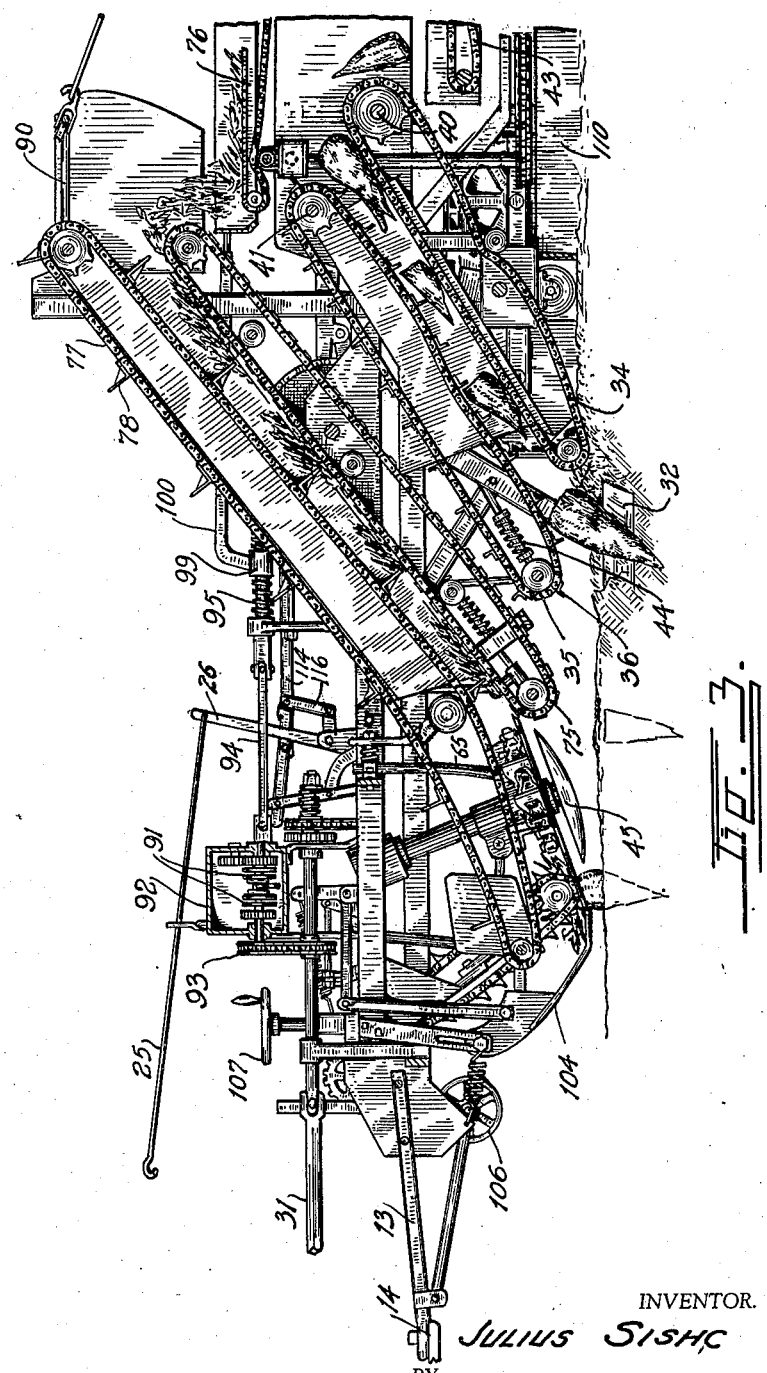
INVENTOR.
JULIUS SISHC
BY
ATTORNEY.

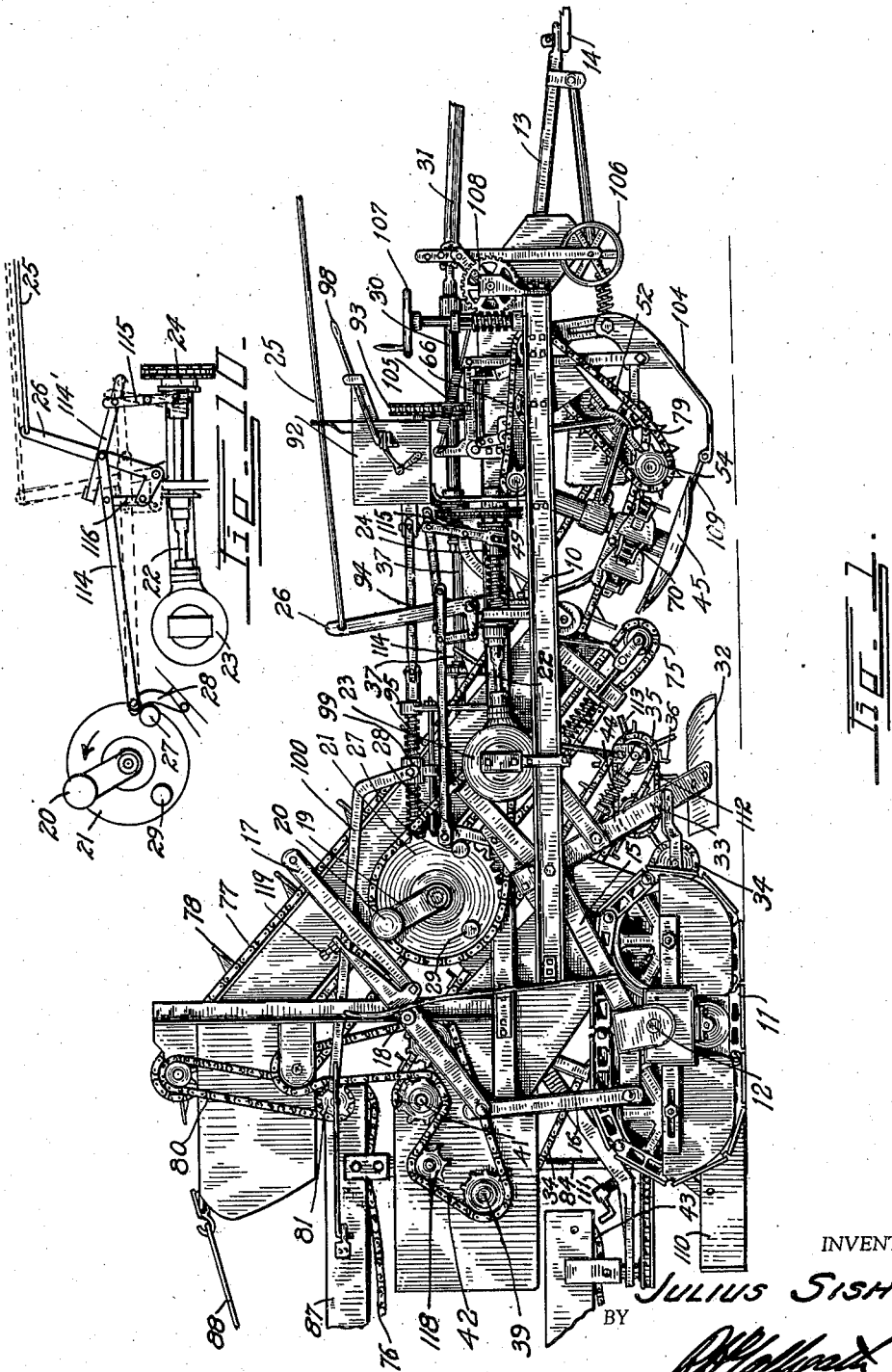

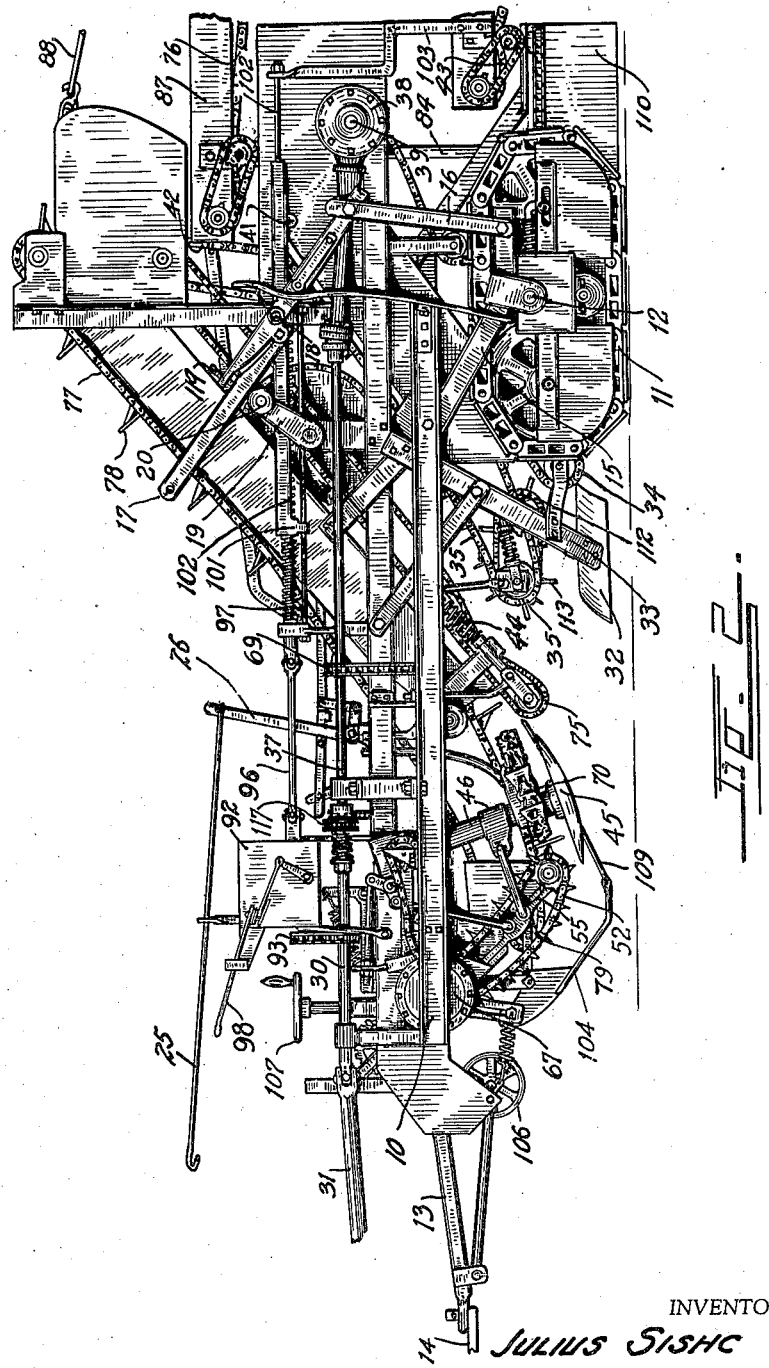

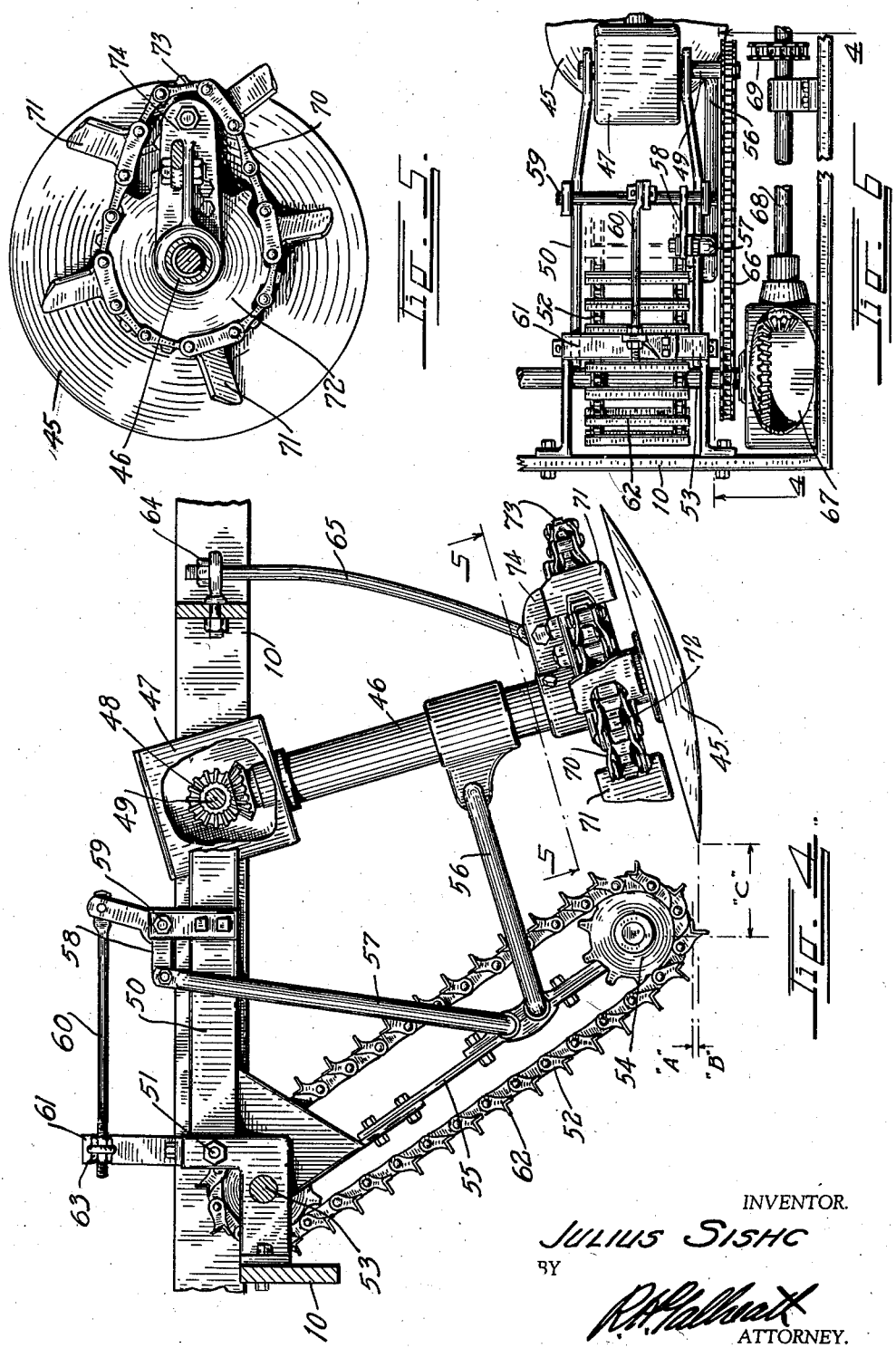

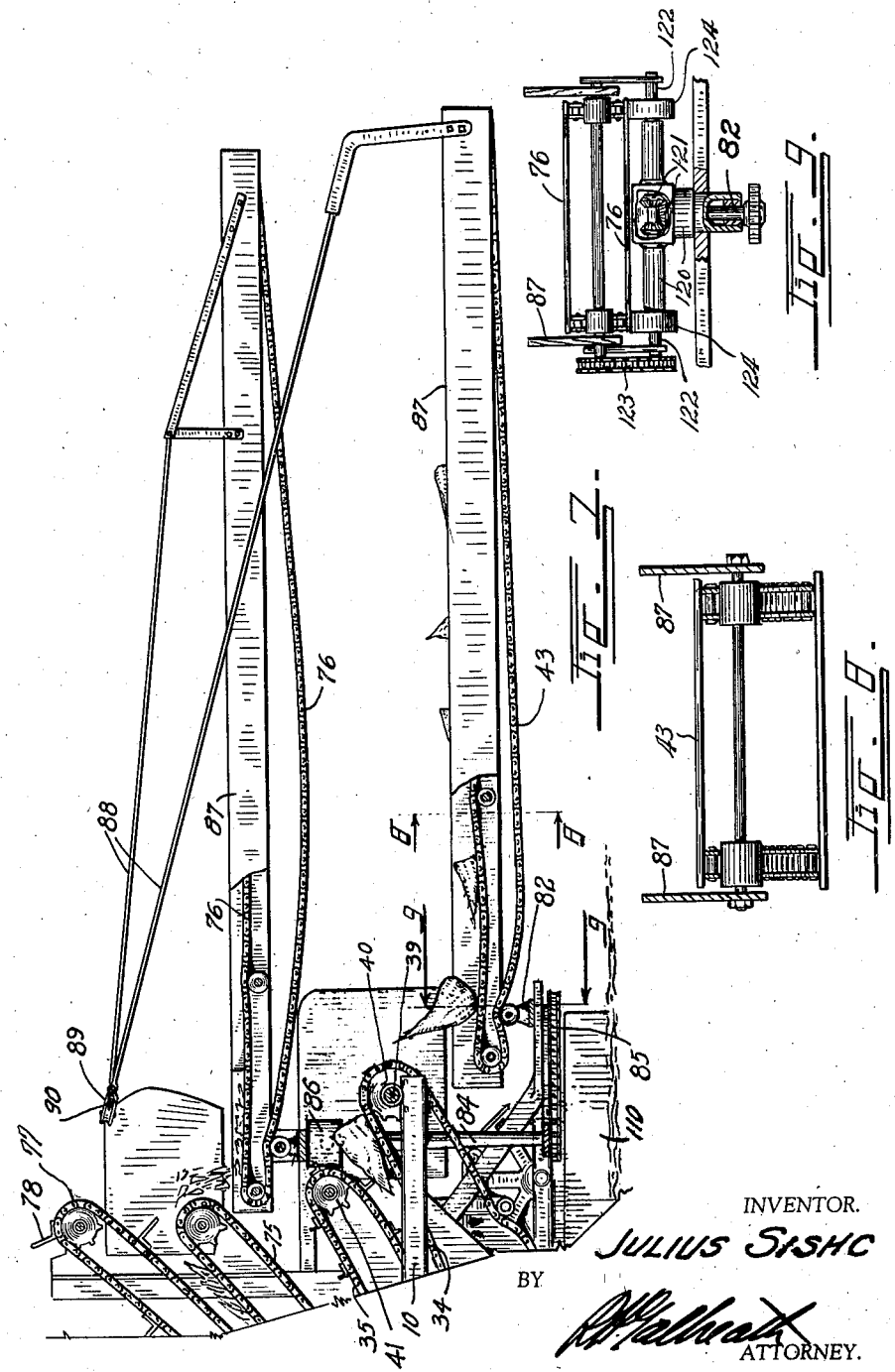

Patented Mar. 2, 1937

2,072,186

UNITED STATES PATENT OFFICE 2,072,186

BEET DIGGING AND TOPPING MACHINE

Julius Sishc, Torrington, Wyo.

Application February 4, 1936, Serial No. 62,261

8 Claims. (Cl. 55—9)

This invention relates to a sugar beet digging and topping machine and has for its principal object the provision of a portable machine to be drawn along the beet rows to simultaneously remove the tops from a plurality of rows; dig the topped beets; deliver the topped beets to any desired location; and deliver the removed tops to any other desired location.

Another object of the invention is to provide a tractor drawn beet digging and depth, position etc. are accomplished by power driven apparatus controlled by the driver of the tractor.

Another object of the invention is to provide a beet topping device which will automatically proportion the thickness or depth of the removed top in accordance with the size of the beet.

Other objects reside in the efficient mechanisms provided for lifting and elevating the beets; handling the tops from the beets; eliminating packing of trash, etc.; and in the means employed for transmitting and controlling power from a tractor to operate the various mechanisms of the digging and topping machine.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a "right" side elevation of the improved digger and topper.

Fig. 2 is a "left" side elevation thereof.

Fig. 3 is a longitudinal section through the improved digger and topper.

Fig. 4 is an enlarged detail view of the topping mechanism, illustrating the action of the automatic top regulating mechanism.

Fig. 5 is an enlarged detail plan view of one of the topping discs, taken on the line 5—5, Fig. 4.

Fig. 6 is a fragmentary plan view of one of the topping mechanisms.

Fig. 7 is a side elevation, partly in section, illustrating the conveyer mechanism which is suspended from the rear of the improved digger and topper for piling or loading the tops and beets.

Fig. 8 is a detail cross section through one of the conveyers, taken on the line 8—9, Fig. 7.

Fig. 9 is a similar cross section taken on the line 8—9, Fig. 7.

Fig. 10 is a diagrammatic view illustrating the operation of the clutch engaging and releasing mechanism.

The invention comprises a suitable frame 10 supported at its rearward extremity upon endless track treads 11 and at its forward extremity by means of a draw bar 13 which may be connected directly to the draw bar hitch 14 of any suitable tractor. Hinge pins 12 provide flexible connections which allow the track treads to rock when passing over uneven ground. There are two of the track treads 11 provided, one at each side of the rear of the frame 10, and a single one of the draw bars 13 provided at the middle of the forward extremity of the frame 10. This provides a three point suspension for the entire machine.

The mounting between the treads 11 and the frame 10 is adjustable so that the entire rearward extremity of the machine may be raised or lowered by power from the tractor. That is accomplished by extending pivoted hinge bars 15 downward and rearward at each side of the frame 10 to carry the weight of the frame to the hinge pins 12. The rearward extremities of the bars 15 are connected by means of supporting links 16 to the rearward extremities of depth adjusting levers 17 at each side of the machine. The levers 17 are pivoted intermediate their extremities as shown at 18.

It can be readily seen that, as the levers 17 are swung, they will act to lift or lower the rearward extremity of the machine. This lifting and lowering is accomplished by means of power driven cranks 19, provided at their extremities with contact rollers 20 which engage the levers 17 to actuate the latter. The cranks 19 are mounted on the extremities of a crank shaft extending laterally across the machine. The crank shaft is rotated from a chain sprocket 21 driven by means of a suitable chain from a drive shaft 22 through a suitable transmission mechanism 23. The rotation of drive shaft 22 is controlled through the medium of a suitable clutch 24, the operation of which is controlled by means of a clutch lever 115. A toggle arm formed of two hinged-together parts, 114 and 114' (see Fig. 10) extend rearwardly from the clutch lever 115 to pawl 28 adjacent the sprocket wheel 21. The latter is provided with a first stop boss 27 and a second stop boss 29 which engage the pawl 28. When the toggle arm 114 is straight, the bosses 27 or 29 engage the pawl 28 to push the clutch lever to the released position. When the toggle arm is broken, as shown in full line in Fig. 10, the clutch lever is released to allow the clutch spring to face the clutch to the engaged position. The "breaking" of the toggle arm is accomplished by means of a bell crank lever 26 and a link 116. A cable or control rod extends from the lever 26 to a convenient position for the driver of the tractor.

Should it be desired to lower the rearward extremity of the machine from the elevated position of Fig. 1, the operator pulls upon the rod 25. This causes the lever 26 to "break" the toggle arm 114—114' to the full line position of Fig. 10. This releases the clutch lever 115 and allows the clutch 24 to engage. The sprocket wheel 21 now starts to rotate to the left causing the cranks 19 to lower the levers 17, thereby lowering the entire machine.

As soon as the first stop boss 27 moves away from the pawl 28 it will release the latter and allow the toggle arm 114 to straighten to the broken line position of Fig. 10.

When the machine has reached its bottom or operating position, the second stop boss 29 will strike the pawl 28 and through the toggle arm 114 will push the clutch lever to the release position.

The same operation will be repeated when it is desired to again lift the machine to the elevated or out of service position. Through this means, the driver on the tractor can raise and lower the entire machine without effort by simply pulling the bar 25.

A power shaft 30 extends longitudinally over the midportion of the front of the frame 10. The forward extremity of the power shaft is connected by means of a universal shaft section 31 to the usual power shaft stub of the tractor (not shown). Thus power will be continuously supplied to the various power driven elements from this shaft, and it is this shaft which furnishes power to the shaft 22 when the clutch 24 is engaged.

The device may be employed to simultaneously dig any desired number of rows. As illustrated, it is constructed to dig two adjacent rows. In such a construction, two pairs of digging blades 32 are suspended below the frame 10 upon four plow beams 33. By raising or lowering the machine as before described, these plows may be lowered into or lifted from the ground, as desired.

Immediately behind and above each pair of plows, is a beet lifting chain 34 extending rearwardly and upwardly to lift and convey the dug beets. To hold the beets upon the chain 34, a beet clamping chain 35 is provided immediately above each of the chains 34. In a two row machine, there will be two of the chains 34 and two of the chains 35. The chain 35 is preferably formed with flights 36 upon it which engage and hold the beets during their upward movement.

The chains 35 and 34 move at the same speed. These chains are driven from the power shaft 30 through the medium of a side shaft 37 which extends along the left side of the machine and terminates in a bevel gear housing 38. The side shaft 37 is driven from the power shaft 30 by means of a chain 117. The gears in the housing 38 transmit the power to a lateral shaft 39 upon which sprockets 40 are mounted to carry and drive the chains 34. The chain 35 is driven from a sprocket shaft 41, which is driven from the lateral shaft 39 by means of a chain 42 on the right side of the machine.

It can be readily seen that, as the beets are dug and lifted from the ground by the plows 32, they will be grasped between the chains 35 and 34 and carried upwardly until deposited over the upper reach of the chain 34 upon a conveyer 43, to be later described. The upper chain is provided with tension springs 44 which allow it sufficient flexibility to accommodate beets of varying sizes.

The topping is accomplished while the beets are still in the ground and before they reach the plows. The topping mechanism for each row consists of a rotary disc knife 45, there being one knife disc mounted ahead of each pair of plows.

The knives 45 are carried on the lower extremities of knife shafts which extend downwardly through shaft sleeves 46 suspended from transmission boxes 47 containing suitable bevel gears 48 for transmitting power to the knives. The boxes 47 are suspended on lateral knife shafts 49 journaled in floating frames 50 pivoted at their forward extremities on suitable pivot bolts 51. Thus the knives and their drive mechanisms are free to raise and lower during the operation of the machine.

The raising and lowering of each topping mechanism is accomplished by means of an endless beet-engaging chain 52 driven from a chain shaft 53. At its lower extremity the chain 52 is trained around a sprocket 54 carried on the lower extremity of a chain frame 55, which in turn is pivoted upon the shaft 53. A link 56 connects the chain frame 55 with the sleeve 46 and a second link 57 extends upwardly from the chain frame 55 to one extremity of a bell crank lever 58 hinged at 59 on the floating frame 50. The other extremity of the bell crank lever 58 is pivotally connected by means of tie rod 60 with a fixed bracket 61 connected through to the main frame 10 of the machine.

The action of the knife regulating mechanism is as follows: Let us assume that the beet chain 52 approaches a large beet protruding above the ground. The chain is formed with steps or flight members 62 which engage the side of the beet and climb upon it. This forces the sprocket 54 backwardly and upwardly, swinging the chain frame 55 rearwardly about its pivot on the shaft 53. This rearward movement of the chain frame does two things, first it swings the knife 45 rearwardly about the shaft 48 as a pivot; second, it, through the medium of the link 57, pushes upward on the bell crank lever 58 and causes it to act about the hinge pin 59 as a fulcrum to lift the entire floating frame 50, thereby lifting the knife 45 upward.

The knife will not move upward as great a distance as the sprocket 54 moves upward owing to the lever action at 58 and 55. Therefore, for large beets, the space between the bottom of the chain 52, indicated at "A", Fig. 4, and the cutting edge of the knife, indicated at "B", will be proportionately greater than the same space for small beets. This causes the knife to cut a thicker top from large beets than it does from small beets, thereby automatically removing the proper proportional amount of top.

The rearward movement of the knife by the link 56 when large beets are encountered provides a proportionally greater space between the sprocket 54 and the knife edge (indicated at "C", Fig. 4) on large beets to allow ample room between the high point of the beet and the entering edge of the knife. This is a necessary arrangement otherwise the sprocket 54 would move entirely off a small beet and before the knife engaged it, or the sprocket would not have reached the top of a large beet before the knife engaged it. But, by making this distance automatically variable, the cutting action begins only when the sprocket 54 reaches the highest point on the beet regardless of the variation in size of the beets. The proper topping for all beets can be set in advance by means of lock nuts 63 at the bracket 61. The maximum lowering of the knife can be set by means of a nut 64 on a knife supporting bar 65.

Power is supplied to each of the lateral knife shafts 49 in the floating frames 50 by means of power chains 66 extending from the shaft 53. The shaft 53 extends entirely across the frame 10 and is driven from a gear box 67 through a side shaft 68 driven by means of a chain 69 from the side shaft 37.

The two knife discs 45 rotate inwardly at their front edges. Each disc carries a short endless sweep chain 70 immediately above the disc. This chain is provided with paddles 71 which act to sweep the cut tops from the knife toward the middle of the machine. The chains 70 are trained from drive sprockets 72 around idler sprockets 73. The idler sprockets are supported from brackets 74 secured on the shaft sleeves 46. The two chains 70 upon the two knife discs 45 cooperate to sweep the tops inwardly and rearwardly to a receiving plate 109 from which they are swept by a top chain 77 to an elevator 75 which carries them upwardly and deposits them on a conveyer 76. The top chain 77 is provided with sweeps 78 which grip and hold the tops on the elevator 75. The top chain 77 extends centrally throughout the machine from an idler roller 79 ahead of the knives 45. The elevator 75 is driven through the medium of the chain 42 from the lateral shaft 39. The top chain 77 is driven through the medium of a drive chain 80 from a sprocket 81, the teeth of which engage in the chain 42.

The conveyer 43 and the conveyer 76 are pivoted so that their rearward extremities may be swung to any desired position. The pivot shaft of the conveyer 43, which also serves as the drive shaft for the conveyer, is shown at 82. The pivot and drive shaft 82 is driven from a vertical drive shaft 84 through the medium of suitable sprocket chain 85.

The vertical drive shaft 84 is driven from a miter gear box 86 to which power is supplied from a short horizontal shaft terminating in a sprocket 118 which is in mesh with the drive chain 42. The upper extremity of the vertical shaft 84 serves as the pivot and drive shaft for the upper conveyer 76. The vertical drive shaft 84 passes between the two elevators 34.

The shaft 82 and the upper extremity of the shaft 84 are housed in T-shaped shaft housings 120 enclosing a set of miter pinions 121 which transmit the power to a jack shaft 122. One of the pinions 121 on the shaft 122 is loose and acts simply as a balancing or supporting pinion. The jack shaft 122 drives the conveyer through the medium of a short chain 123. The shaft 122 also supports two loose pulleys 124 which support the lower reach of the conveyer around the end driving sprockets as shown in Fig. 7.

The conveyers 43 and 76 are positioned between side boards 87, which form a frame for supporting the conveyer rolls. The side boards are supported at their rearward extremities upon hanger rods 88 extending from pulleys 89 which travel around a curved bale 90. The swinging of the conveyers to the desired positions is accomplished mechanically by means of a reversing gear mechanism 91 carried in a gear box 92. Power is supplied to the reversing gear mechanism by means of a chain 93 from the power shaft 30. Power is delivered from the reversing mechanism through a universal shaft 94 to a threaded shaft 95 on the right side of the machine and through a universal shaft 96 to a threaded shaft 97 on the left side thereof. By shifting a shift lever 98, either of the shafts 94 or 96 can be rotated in either desired direction. The gear mechanism in the box 92 need not be described in detail since it is similar to any reversing clutch transmission.

The "right" threaded shaft 95 carries a nut 99 which travels along the threads of the shaft depending of course upon the direction of rotation. The movement of the nut 99 is transmitted by means of push rod 100 to the upper conveyer 76. Thus as the nut 99 travels rearwardly, it will swing the conveyer 76 to the left and when traveling forwardly will swing it to the right. The "left" threaded shaft 97 carries a similar nut 101 which is connected by means of a push rod 102 with a bracket 103 on the lower conveyer 43. The nut in moving along the threaded shaft 97 acts similarly to the nut 99 to swing the lower conveyer 43 to the left or the right as desired.

A guide shoe 104 precedes the knife disc and travels between the beet rows to guide the knives therealong. This guide shoe may move upwardly upon striking rocks or other objects and is constantly forced downwardly by means of a tension spring 105. The top-receiving plate 109 projects rearwardly from the guide shoe 104 to receive the tops from the discs 45.

A supporting wheel 106 is provided to support the forward extremity of the frame 10 when the latter is not supported by the tractor. This wheel can be forced downwardly into the supporting position by means of a hand wheel 107 acting through a worm wheel lever device 108.

In a two row puller the two middle plow beams are necessarily placed very close together. For this reason, clods, sticks, and trash may catch and pile between the beams. To prevent this, a short endless trash chain 112 is mounted between the two clamping chains 35 upon the same shaft that carries the lower sprockets for the latter chain. The trash chain extends rearwardly over an idler between the two middle plow beams 33 and is provided with a series of paddles or hooks 113 which catch and throw the trash and clods from between the beams.

A V-shaped drag 110 is suspended beneath the rear of the machine which may be raised or lowered by means of a suitable jack screw 111. This drag acts to smooth and level a trough-like area behind the machine upon which the beets may be deposited by the conveyer 43.

It is preferred to employ the drag 110 upon each twelfth row in the field and to swing the conveyer 43 so as to pile the beets from twelve rows along the smoothed path thus provided. The tops may be piled along another similar path.

It is preferred to form the lifting levers 17 in two parts, as illustrated. This allows a set screw 119 to be provided for adjusting the contact of the levers 17 with the cranks 20 so that lost motion may be taken up and so that the machine may be accurately leveled.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A beet digging and topping device comprising: a rotary knife positioned to top beets while the latter are in the ground; a lifting plow following said knife to lift the beets from the ground; an inclined beet elevator positioned to the rear of said plow to receive the lifted beets from said plow; a clamping chain extending rearwardly over said elevator so as to clamp the beets between said elevator and said chain during the elevating operation; and means for positively driving said clamping chain so that the lower reach there will move in the same direction as the upper reach of said elevator.

2. A beet digging and topping machine comprising: a supporting frame; wheels supporting the rear extremity of said frame; a pair of rotary knives suspended from the forward extremity of said supporting frame for topping the beets while the latter are in the ground; two pairs of digging plows suspended below the rearward extremities of said frame, there being one pair of digging plows to the rear of each of said knives; elevators for elevating the beets dug by each pair of plows, an elevator for elevating the tops cut from the beets by both of said knives; and means for sweeping the tops from each knife to said latter elevator.

3. In a beet digging and topping machine of the type having topping and digging means suspended from a supporting frame, means for raising and lowering the rearward extremity of said frame comprising: rearwardly extending hinged bars pivoted to said frame; supporting wheels connected with the rearward extremity of said hinged bars; and a power-actuated mechanism for raising and lowering the rearward extremity of said hinged bars.

4. In a beet digging and topping machine of the type having topping and digging means suspended from a supporting frame, means for raising and lowering the rearward extremity of said frame comprising: rearwardly extending hinged bars pivoted to said frame; supporting wheels connected with the rearward extremity of said hinged bars; and a power-actuated mechanism for raising and lowering the rearward extremity of said hinged bars, said mechanism comprising: depth adjusting levers pivoted intermediate their extremities at each side of said frame above said hinged bars; a connecting link between the rearward extremity of each lever and the rearward extremity of each hinged bar; a crank shaft extending beneath the forward extremities of said levers; and cranks on said crank shaft positioned to engage said levers so as to swing the latter about their pivots.

5. In a beet digging and topping machine of the type having topping and digging means suspended from a supporting frame, means for raising and lowering the rearward extremity of said frame comprising: rearwardly extending hinged bars pivoted to said frame; supporting wheels connected with the rearward extremity of said hinged bars; and a power-actuated mechanism for raising and lowering the rearward extremity of said hinged bars, said mechanism comprising: depth adjusting levers pivoted intermediate their extremities at each side of said frame above said hinged bars; a connecting link between the rearward extremity of each lever and the rearward extremity of each hinged bar; a crank shaft extending beneath the forward extremities of said levers; and cranks on said crank shaft positioned to engage said levers so as to swing the latter about their pivots; a clutch for controlling the power supply to said crank shaft; manual means for engaging said clutch and automatic means for disengaging said clutch when said levers reach their extreme positions.

6. In a beet digging and topping machine; a first elevator for elevating the dug beets; a second elevator for elevating the cut tops; a first conveyer for receiving the beets from said first elevator; a second conveyer for receiving the beets from said second elevator; a horizontally positioned threaded shaft at each side of said machine; a nut traveling along each threaded shaft; a connection between each of said nuts and one of said conveyers, so that movement of said nuts will act to swing said conveyers; and means for connecting said threaded shafts with a source of power supply so that either of said shafts can be rotated in either direction.

7. A combined digging and topping machine comprising: a frame; means for supporting the forward extremity of said frame; wheels supporting the rearward extremity of said frame; means for raising and lowering said frame with reference to said wheels; a pair of endless beet engaging chains hingedly suspended from said frame adjacent its forward extremities; a pair of knife shafts hingedly suspended to the rear of said chains; a rotary knife carried on the lower extremity of each knife shaft; a top elevator extending from a position between said knife shafts rearwardly and upwardly; means for sweeping the tops cut by said knives onto said top elevator; a pair of beet digging plows positioned back of said knives; a beet elevator back of each pair of digging plows; a beet clamping chain suspended over each beet elevator for clamping and holding the beets thereon; a first conveyer for receiving the tops from said top elevator; a second conveyer for receiving the beets from said beet elevator; and means for swinging said conveyers so as to deliver said beets and said tops at any desired point.

8. A combined digging and topping machine comprising: a frame; means for supporting the forward extremity of said frame; wheels supporting the rearward extremity of said frame; means for raising and lowering said frame with reference to said wheels; a pair of endless beet engaging chains hingedly suspended from said frame adjacent its forward extremities; a pair of knife shafts hingedly suspended to the rear of said chains; a rotary knife carried on the lower extremity of each knife shaft; a top elevator extending from a position between said knife shafts rearwardly and upwardly; means for sweeping the tops cut by said knives onto said top elevator; a pair of beet digging plows positioned back of each of said knives; a beet elevator positioned back of each pair of digging plows; a beet clamping chain suspended over each beet elevator for clamping and holding the beets thereon; a first conveyer for receiving the tops from said top elevator; a second conveyer for receiving the beets from said beet elevator; and means for swinging said conveyers so as to deliver said beets and said tops at any desired point; a power shaft; means for connecting said power shaft to a source of power; and means for connecting said power shaft to said means for raising and lowering said frame and to said means for swinging said conveyers when desired.

JULIUS SISHC.